United States Patent [19]

Mead

[11] Patent Number: 4,894,914
[45] Date of Patent: Jan. 23, 1990

[54] GRASS TRIMMING DEVICE

[75] Inventor: David E. Mead, Co.Durham, United Kingdom

[73] Assignee: Electrolux Northern Limited, Durham, United Kingdom

[21] Appl. No.: 209,272

[22] Filed: Jun. 20, 1988

[30] Foreign Application Priority Data

Jun. 24, 1987 [GB] United Kingdom ............. 8714817

[51] Int. Cl.⁴ .................................................. B26B 7/00
[52] U.S. Cl. ...................................... 30/276; 30/275.4; 56/12.7
[58] Field of Search ............... 30/343, 276, 296, 297; 56/12.7

[56] References Cited

U.S. PATENT DOCUMENTS

| | | |
|---|---|---|
| 3,561,199 | 2/1971 | Lay . |
| 3,803,819 | 4/1974 | Ehrlich . |
| 4,047,299 | 9/1977 | Bair ................................. 30/347 X |
| 4,419,822 | 12/1983 | Harris ................................. 30/276 |
| 4,463,544 | 8/1984 | Carsello . |
| 4,578,863 | 4/1986 | Loverick ........................... 30/276 |
| 4,603,478 | 8/1986 | Anderson ........................ 30/347 X |

FOREIGN PATENT DOCUMENTS

| | | |
|---|---|---|
| 0005540 | 11/1979 | European Pat. Off. . |
| 3010092 | 9/1981 | Fed. Rep. of Germany . |
| 596283 | 12/1947 | United Kingdom . |
| 722874 | 2/1953 | United Kingdom . |
| 747292 | 4/1956 | United Kingdom . |

Primary Examiner—Frank T. Yost
Assistant Examiner—Willmon Fridie, Jr.
Attorney, Agent, or Firm—Pearne, Gordon, McCoy & Granger

[57] ABSTRACT

A grass trimming device is capable of adopting at least two alternative configurations, in one of which a cutting plane is substantially horizontal for use in grass trimming, and in the other of which the cutting plane is substantially vertical for edge trimming. A parting plane is defined by a housing of the cutting head such that rotation about an axis perpendicular to this plane through 180° results in the required switching. The shaft axis is preferably inclined at 10°–15° with respect to the rotational axis.

11 Claims, 3 Drawing Sheets

GRASS TRIMMING DEVICE

BACKGROUND OF THE INVENTION

1. Technical Field

The present invention relates to a grass trimming device including a cutting head provided with grass cutting means rotatable in a cutting plane, and shaft means which is connected to said cutting head. The device is capable of being switched between at least two alternative configurations which are suitable for grass trimming or strimming and edge trimming respectively.

2. Prior Art

There have been various proposals for producing such a device which combines the ordinary grass trimming function with a lawn edging function. Federal Republic of Germany Pat. Specification No: 3 010 092 shows such a device in which the handle can be moved from a first socket on the cutting head to a second socket on the same head in order to shift the cutting head from a configuration in which the cutting plane is horizontal for grass trimming to a configuration in which the cutting plane is vertical for edge trimming. In both configurations of the device a shaft fitted with a handle of the shaft means is directed upwardly towards the operator. This device suffers from the drawback that changing from one function to the other is difficult because it is necessary to release and then remove the handle from one socket and then replace it and lock it into position in the second socket.

European Application No. 0 005 540 shows a similar device where the handle is pivotally adjustable in a plane which is perpendicular to the cutting plane. Changing the configuration of this device requires releasing a handle catch, turning the handle through 180°, releasing the cutting head and then adjusting it to the required angle. Moreover, a relatively complex arrangement of parts is necessary to achieve the change-over. This results in considerable expense and a risk that the components, which are not totally covered may be damaged by the ingress of dirt and debris.

SUMMARY OF THE INVENTION

It is an object of the invention to provide a grass trimming device which is simple and reliable and which can be switched quickly and conveniently between its two functions.

The present invention accordingly provides a grass trimming device in which a parting plane is defined on the cutting head and a coupling section of the shaft means is connected to said cutting head at said parting plane by means of a coupling which permits relative rotation between said cutting head and said shaft about an axis extending perpendicular to said plane such that the cutting plane is moved between a first position in which it is substantially horizontal and a second position in which it is substantially vertical.

With such a device only a relative rotation of the shaft and cutting head is necessary to switch between the two configurations.

Some embodiments of the invention will now be described, by way of example only, with reference to the accompanying diagrammatic drawings.

DESCRIPTION OF A PREFERRED EMBODIMENT

Figure 2:
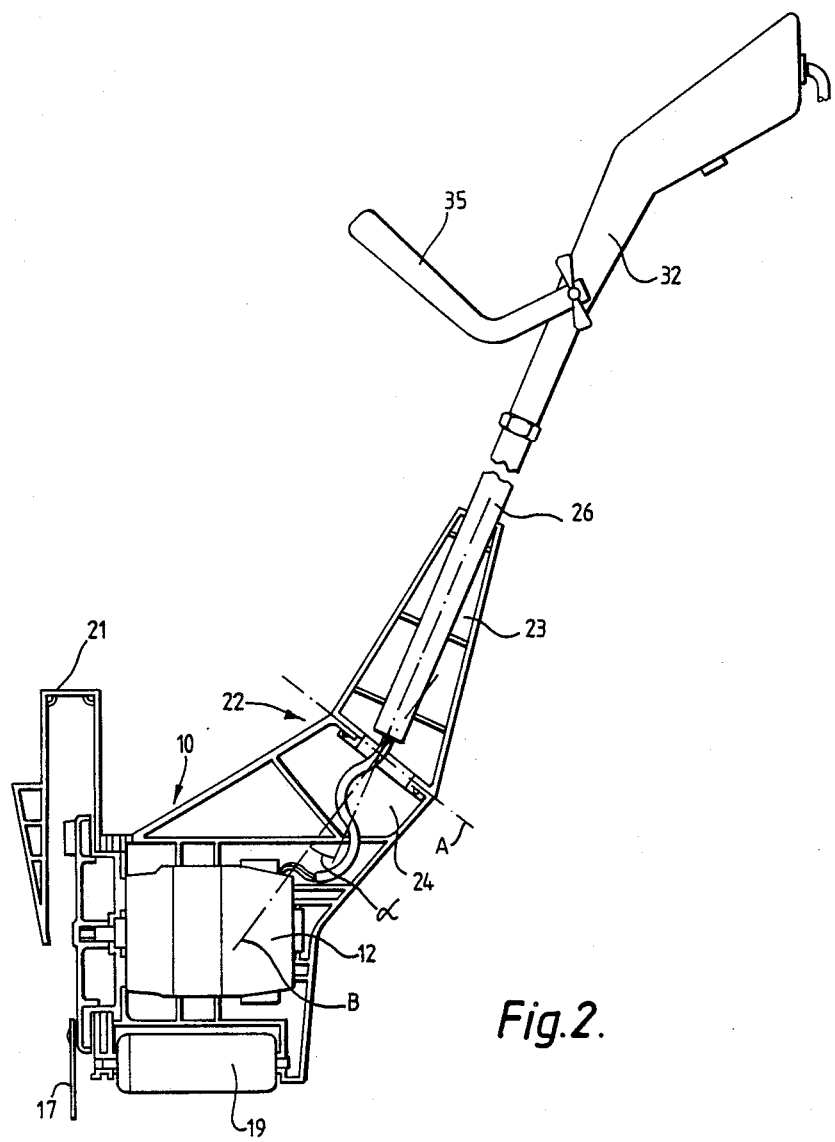
FIG. 2 is the same view with the device in a vertical edging configuration.

As shown in the drawings the grass trimming device comprises a cutting head 10 which is defined by a plastics hood or housing 11 which accommodates an electric motor 12. The motor 12 has a shaft 13. A rotatable disc 14 is fixed to the lower end of the shaft 13. One side of the disc 14 is formed as a radial fan 15 for drawing cooling air over the motor 12. A metal rivet 16 is fixed to the periphery of the disc to provide a mounting for a plastics blade 17 so that it can be turned over a controlled distance. On the opposite side of the disc from the rivet 16 a weight 18 is provided to balance the rivet and blade arrangement. A roller 19 is fitted to the cutting head by means of a shaft 20 about which the roller is free to rotate. The ends of the shaft 20 are fitted into corresponding sockets defined by the housing 11. The shaft 20 is arranged parallel to the motor shaft 13. The purpose of this roller is to rest on the ground when the trimming device is in its edging configuration (FIG. 2). A guard 21 is fitted to the housing over a sector of the area in which the blade rotates in order to protect the operator from touching the rotating blade.

Figure 3:
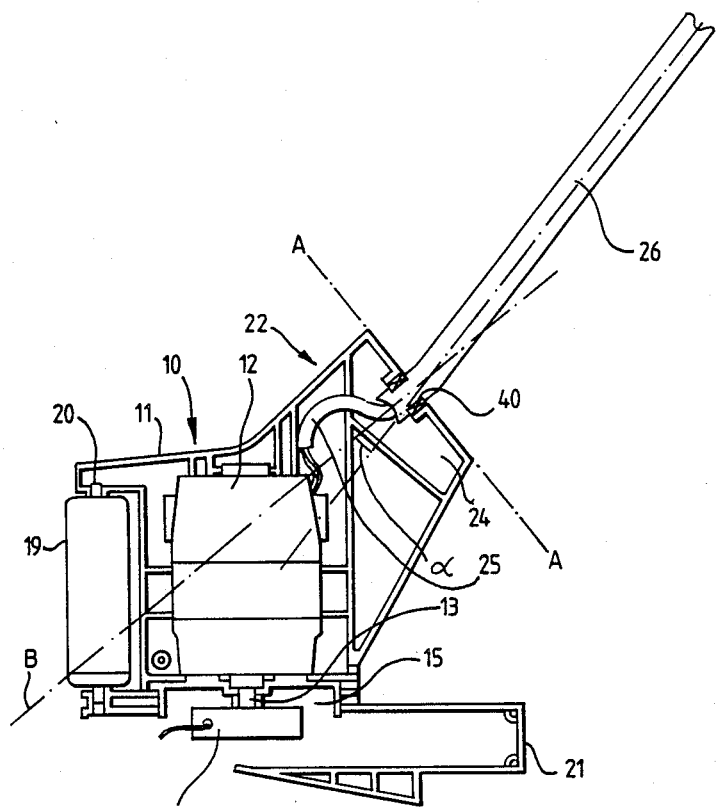
FIG. 3 is a view similar to FIG. 1 showing some modifications of the first embodiment.

Instead of a blade 17, the shaft 13 of the motor may be arranged to rotate a conventional flexible line feed unit 38 as shown in FIG. 3.

The upper part of the housing of the cutting head is shaped as a neck 22, an upper face of which defines a parting plane A where the housing of the cutting head is connected to a coupling section 23 at a lower end of a shaft 26. The section 23 is formed as an upper housing part 23 and receives one end of the tubular steel shaft 26. A cable 25 passes through the shaft 26 and the coupling section 23 into a section 24 of the housing. Thus the cable 25 passes across the parting plane A through facing openings in the sections 23,24. The coupling section 23 together with the section 24 forms a swivel coupling.

At the lower end of the coupling section 23 there is provided an inwardly directed flange 27 which is U-shaped in cross section thereby defining an annular, outwardly facing, U-shaped groove 28. The upper face of the section 23 is also provided with an inwardly directed annular flange 29. The flange 29 is inserted into the groove 28 so that the annular faces of the two sections are in contact with one another in the parting plane A. The sections 23, 24 can be turned relative to one another about an axis B which is perpendicular to the parting plane A. At two diametrically opposite positions a recess 30 is formed in an inwardly facing side wall of the flange 27. At corresponding positions in the plane A, in the flange 29 there is provided a lug 31. The lugs latch in the recesses in order to keep the two sections locked together during trimming or edging. When the sections 23, 24 are switched between the two illustrated configurations the lugs seat in opposite ones of the recesses. Further indexing positions may be provided by defining recesses at other angular positions on the flange 27 so that the sections can be locked at intermediate positions between the two shown in FIGS. 1 and 2.

It should be noted that the axis B is not parallel to the axis of the shaft 26 but is inclined at an angle α which is preferably in a range 10–15°. An appropriate setting is chosen so that the shaft 26 is directed towards the operator at a convenient angle in both the horizontal and the vertical configuration. This angle is chosen so that a 180° relative rotation of the sections 23, 24 gives a good operating position for both trimming and edging. At the upper end of the shaft 26 a carrying handle 32 with an operating switch 33 is provided. An electric cable enters the handle at a cable entry opening 34 and passes via the switch 33 down the shaft 26 to the electric motor 12. The lower end of the handle 32 is clamped around the upper end of the shaft 26. Adjacent to this fastening a support handle 35 is connected by means of a bolt and wing nut arrangement 36. The support handle 35 can be pivoted about the bolt to adjusts its operating height. The height of the handle can also be adjusted by making the shaft 26 in two telescopically connected parts. One part of such a telescopic shaft is slidably inserted in the other part so that the parts can be locked together by means of a bolt 37.

As illustrated the hood or housing of the cutting head is formed by two plastics moldings which are clamped to each other and enclose the roller shaft and the motor. The upper section 23 at the end of the shaft 26 is formed as a separate molding. The carrying handle may also be molded as two parts which are clamped around the shaft.

Figure 1:
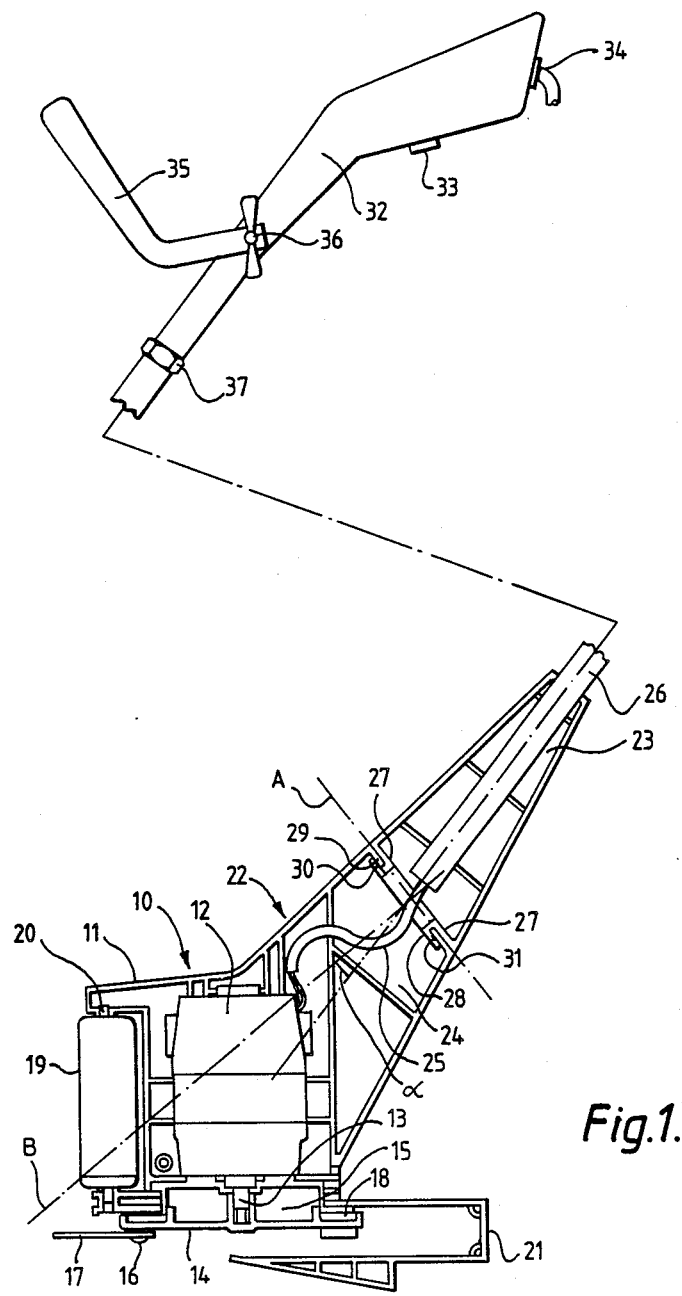
FIG. 1 is a partly broken away side elevation of the device in a grass trimming configuration.

It will be appreciated that the interlocked flange coupling illustrated in FIGS. 1 and 2 is not the only possible coupling for connecting the shaft means to the cutting head so that relative rotation between these two parts shifts the cutting blade between a horizontal and vertical cutting plane. For example, a ball and socket joint may be employed. In another alternative form of coupling, as shown in FIG. 3, the shaft 26 may itself be bent through an angle α and the lower bent end 40 of the shaft fitted into a receiving socket defined in an upper face of section 24. This receiving socket is perpendicular to the parting plane and the bend in the shaft is preferably close to the coupling with the cutting head.

I claim:

1. A grass trimming device comprising:
a cutting head including a grass cutting means rotatable in a cutting plane;
shaft means including a coupling section and an elongate shaft, the coupling section coupling together the cutting head and the shaft means, the elongate shaft having a first end defining or connected to the coupling section and a second end having an associated handle;
the cutting head including a surface defining a parting plane at which plane the said coupling section is coupled to the cutting head, said parting plane extending laterally with respect to the length of said shaft means, means permitting relative angular movement at the parting plane between the coupling section and the cutting head about a turning axis which is disposed substantially perpendicular to the parting plane and obliquely to the shaft so that relative movement between the coupling section and the cutting head about the parting plane positions the cutting plane in different operating orientations.

2. A device according to claim 1, in which said parting plane is oriented such that the oblique angle defined between said turning axis and a longitudinal axis of said shaft is in the range 10–15°.

3. A device according to claim 1, in which said coupling section and said cutting head include latch means operative to lock said coupling section and said cutting head into said first or said second operating orientations 4. A device according to claim 1, in which said shaft comprises two tubular parts which are slidably arranged with respect to each other, and means for locking said parts in various selected positions.

5. A device according to claim 1, in which said grass cutting means includes a disc, to the periphery of which a replaceable blade is mounted.

6. A device according to claim 1, in which said grass cutting means includes a flexible line feed unit.

7. A device according to claim 1, in which relative angular movement between said coupling section and said cutting head of 180° moves said cutting plane between the first and second orientations in which the cutting plane is positioned in substantially horizontal and vertical planes.

8. A device according to claim 1, wherein the means permitting relative angular movement include an annular flange fitting and an annular U-shaped groove fitting into which said annular flange is inserted and wherein the coupling section and the cutting head each carry one fitting.

9. A device according to claim 1, wherein the means permitting relative angular movement includes an annular flange fitting and an annular U-shaped groove fitting into which said annular flange is inserted and wherein the coupling section and the cutting head each carry one fitting.

10. A device according to claim 1, in which said cutting head includes a roller positioned to support the device on the ground when said cutting plane is disposed in a substantially vertical operating orientation.

11. A grass trimming device including:
a cutting head provided with grass cutting means rotatable in a cutting plane; and
shaft means which is connected to said cutting head, said shaft means including a coupling section, an elongate shaft having a first end defining or connected to said coupling section and a second end and a handle provided at said second end;
said cutting head and coupling section defining a parting plane extending laterally with respect to said shaft means and connected such as to permit relative rotation between said coupling section and said cutting head about a turning axis extending perpendicular to said parting plane and inclined relative to said cutting plane, whereby said cutting plane is moved between a first position in which it is substantially horizontal in operating orientation and a second position in which it is substantially vertical in an operating orientation.

* * * * *